US008885710B2

(12) United States Patent
Park et al.

(10) Patent No.: US 8,885,710 B2
(45) Date of Patent: Nov. 11, 2014

(54) METHOD AND DEVICE FOR ENCODING/DECODING VIDEO SIGNALS USING BASE LAYER

(75) Inventors: Seung Wook Park, Sungnam-si (KR); Ji Ho Park, Sungnam-si (KR); Byeong Moon Jeon, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 819 days.

(21) Appl. No.: 13/067,497

(22) Filed: Jun. 6, 2011

(65) Prior Publication Data

US 2011/0235714 A1 Sep. 29, 2011

Related U.S. Application Data

(63) Continuation of application No. 11/231,868, filed on Sep. 22, 2005, now abandoned.

(60) Provisional application No. 60/612,180, filed on Sep. 23, 2004.

(30) Foreign Application Priority Data

Dec. 30, 2004 (KR) ........................ 10-2004-0116898

(51) Int. Cl.
| | |
|---|---|
| H04N 7/12 | (2006.01) |
| G06K 9/36 | (2006.01) |
| H04N 19/63 | (2014.01) |
| H04N 19/33 | (2014.01) |
| H04N 19/70 | (2014.01) |
| H04N 19/61 | (2014.01) |
| H04N 19/615 | (2014.01) |
| H04N 19/46 | (2014.01) |
| H04N 19/31 | (2014.01) |
| H04N 19/42 | (2014.01) |
| H04N 19/13 | (2014.01) |

(52) U.S. Cl.
CPC ... *H04N 19/00818* (2013.01); *H04N 19/00436* (2013.01); *H04N 19/00478* (2013.01); *H04N 19/00884* (2013.01); *H04N 19/00121* (2013.01); *H04N 19/00781* (2013.01); *H04N 19/00787* (2013.01); *H04N 19/00545* (2013.01); *H04N 19/0043* (2013.01)
USPC ...................................... 375/240.12; 382/238

(58) Field of Classification Search
USPC ................. 375/240.01–240.29; 382/233–238
See application file for complete search history.

(56) References Cited

U.S. PATENT DOCUMENTS

| | | | |
|---|---|---|---|
| 8,228,984 B2 * | 7/2012 | Jeon et al. ................ | 375/240.12 |
| 8,249,159 B2 * | 8/2012 | Li et al. .................... | 375/240.16 |
| 2005/0195896 A1 * | 9/2005 | Huang et al. ............. | 375/240.03 |
| 2005/0195900 A1 * | 9/2005 | Han ........................... | 375/240.21 |
| 2009/0168872 A1 | 7/2009 | Jeon et al. | |
| 2009/0310680 A1 | 12/2009 | Jeon et al. | |

FOREIGN PATENT DOCUMENTS

| | | |
|---|---|---|
| KR | 10-2001-0074974 A | 8/2001 |
| KR | 10-2004-0054747 A | 6/2004 |

OTHER PUBLICATIONS

Notice of Allowance issued Dec. 8, 2008 by the Korean Patent Office in a counterpart Korean patent application.

* cited by examiner

*Primary Examiner* — Gims Philippe
(74) *Attorney, Agent, or Firm* — Harness, Dickey & Pierce

(57) ABSTRACT

The present invention relates to encoding and decoding a video signal by motion compensated temporal filtering. In one embodiment, a first sequence of frames are decoded by inverse motion compensated temporal filtering by selectively adding to a first image block in the first sequence image information, the image information being based on at least one of (1) a second image block from the first sequence and (2) a third image block from an auxiliary sequence of frames.

3 Claims, 8 Drawing Sheets

```
flag_BL_fixed_rate
if( flag_BL_fixed_rate )
{
        BL_time_increment_resolution
        BL_time_increment
}
THR_temporally_coincident
```

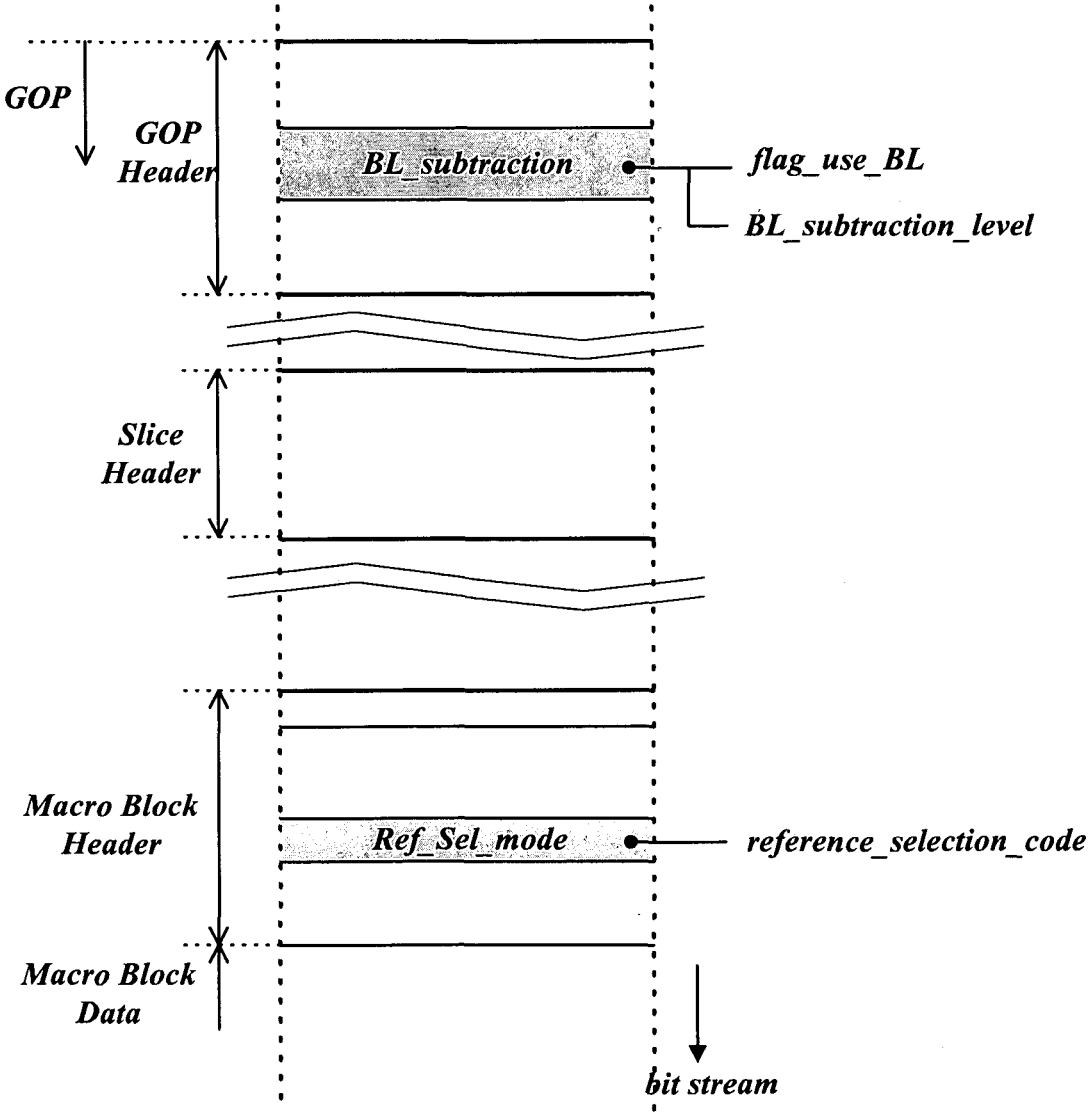

| |
|---|
| flag_use_BL |
| if( flag_use_BL ) |
| { |
|       BL_subtraction_level |
| } |

METHOD AND DEVICE FOR ENCODING/DECODING VIDEO SIGNALS USING BASE LAYER

DOMESTIC PRIORITY INFORMATION

This application is a continuation of and claims priority under 35 U.S.C. §120on U.S. Application Ser. No. 11/231,868, filed Sep. 22, 2005 now abandoned, which claims priority under 35 U.S.C. §119 on U.S. Provisional Application Ser. No.60/612,180, filed Sep. 23, 2004; the entire contents of each of which are hereby incorporated by reference.

BACKGROUND OF THE INVENTION

1. Field of the Invention

The present invention relates to a method and a device for encoding and decoding video signals.

2. Description of the Related Art

A number of standards have been suggested for compressing video signals. One well-known standard is MPEG, which has been adopted as a standard for recording movie content, etc., on a recording medium such as a DVD and is now in widespread use. Another well-known standard is H.264, which is expected to be used as a standard for high-quality TV broadcast signals in the future.

While TV broadcast signals require high bandwidth, it is difficult to allocate such high bandwidth for the type of wireless transmissions/receptions performed by mobile phones and notebook computers, for example. Thus, video compression standards for such devices must have high video signal compression efficiencies.

Such mobile devices have a variety of processing and so that a variety of forms corresponding to a variety of combinations of variables such as the number of frames transmitted per second, resolution, the number of bits per pixel, etc. This imposes a great burden on content providers.

In view of the above, content providers prepare high-bitrate compressed video signals for each video source and perform, when receiving a request from a mobile device, a process of decoding the compressed video signals and encoding it back into video signals suited to the video processing capabilities of a mobile device before providing the requested video signals to the mobile device. However, this method entails a transcoding procedure including decoding, scaling and encoding processes, and causes some time delay in providing the requested signals to the mobile device. The transcoding procedure also requires complex hardware and algorithms to cope with the wide variety of target encoding formats.

A Scalable Video Codec (SVC) has been developed in an attempt to overcome these problems. In this scheme, video signals are encoded into a sequence of pictures with the highest image quality while ensuring that a part of the encoded picture sequence (specifically, a partial sequence of pictures intermittently selected from the total sequence of pictures) can be used to represent the video signals with a low image quality.

Motion Compensated Temporal Filtering (MCTF) is an encoding and decoding scheme that has been suggested for use in the scalable video codec. However, the MCTF scheme requires a high compression efficiency (i.e., a high coding rate) for reducing the number of bits transmitted per second since it is highly likely to be applied to mobile communication where bandwidth is limited, as described above.

Although it is possible to represent low image-quality video signals by receiving and processing part of the sequence of pictures encoded in the scalable MCTF coding scheme as described above, there is still a problem in that the image quality is significantly reduced when the bitrate is lowered.

SUMMARY OF THE INVENTION

Therefore, the present invention has been made in view of the above problems, and it is an object of the present invention to provide a method and a device for encoding video signals in a scalable scheme by additionally using a base layer provided for a lower transfer rate.

The present invention related to encoding and decoding a video signal by motion compensated temporal filtering.

In one embodiment, a first sequence of frames are decoded by inverse motion compensated temporal filtering by selectively adding to a first image block in the first sequence image information, the image information being based on at least one of (1) a second image block from the first sequence and (2) a third image block from an auxiliary sequence of frames.

In another embodiment, a frame in a current frame interval is decoded wherein the second image block is in a frame of the first sequence that is one of prior to and subsequent to a frame including the first image block.

In another embodiment, a frame in a current interval is decoded wherein the third image block is from a frame in the auxiliary sequence of frames that is temporally aligned with a frame including the first image block.

In another embodiment, a frame in a current frame interval is decoded by adding the first image block one of (1) an adjacent image block positioned prior to the first image block or an adjacent image positioned subsequent to the first image block in the first sequence, and (2) the third image block from the auxiliary sequence of frames from at least one of an image block temporally aligned with, before and after an image block in the auxiliary sequence temporally aligned with the first image block.

In another embodiment, a frame in a current frame interval is decoded by adding the first image block two of (1) an adjacent image block positioned prior to the first image block or an adjacent image positioned subsequent to the first image block in the first sequence, and (2) the third image block from the auxiliary sequence of frames from at least one of an image block temporally aligned with, before and after an image block in the auxiliary sequence temporally aligned with the first image block.

BRIEF DESCRIPTION OF THE DRAWINGS

The above and other objects, features and other advantages of the present invention will be more clearly understood from the following detailed description taken in conjunction with the accompanying drawings, in which:

FIG. 7 illustrates the structure of reference block selection mode information carried in macroblock header information according to an embodiment of the present invention;

FIG. 8 illustrates the structure of information required due to the use of the base layer, which is carried in the enhanced layer bitstream, according to an embodiment of the present invention;

DETAILED DESCRIPTION OF PREFFERRED EMBODIMENTS

Example embodiments of the present invention will now be described in detail with reference to the accompanying drawings.

Figure 1:
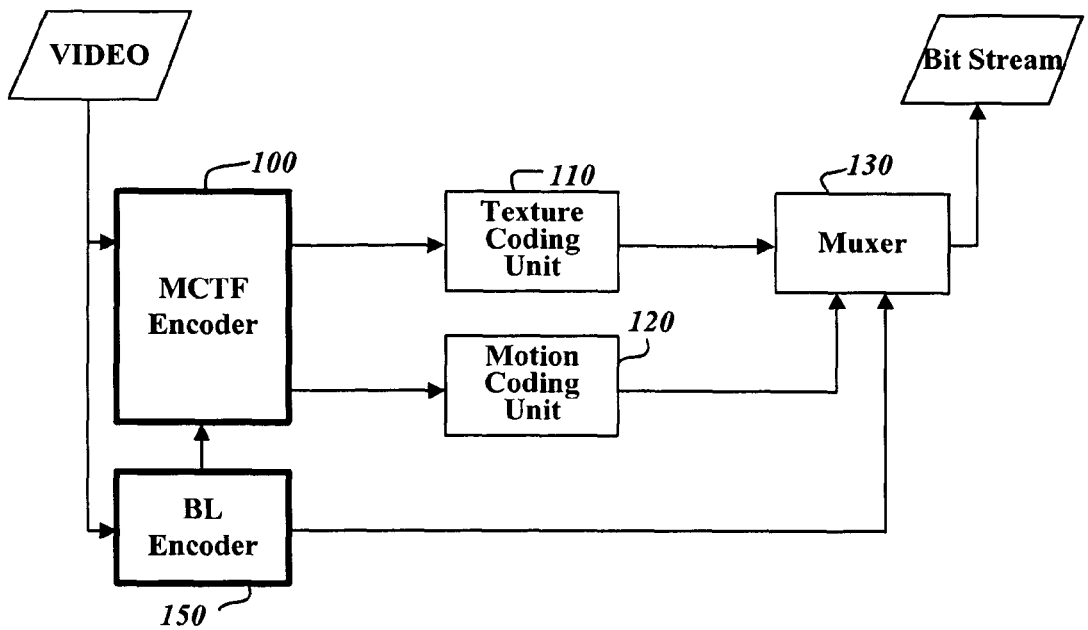
FIG. 1 is a block diagram of a video signal encoding device to which a video signal compression method according to the present invention is applied.

FIG. 1 is a block diagram of a video signal encoding device to which a scalable video signal compression method according to the present invention is applied.

The video signal encoding device shown in FIG. 1 comprises an MCTF encoder 100, a texture coding unit 110, a motion coding unit 120, a base layer encoder 150, and a muxer (or multiplexer) 130. The MCTF encoder 100 encodes an input video signal in units of macroblocks in an MCTF scheme, and generates suitable management information. The texture coding unit 110 converts information of encoded macroblocks into a compressed bitstream. The motion coding unit 120 encodes motion vectors of macroblocks obtained by the MCTF encoder 100 into a compressed bitstream according to a specified scheme. The base layer encoder 150 encodes an input video signal according to a specified scheme, for example, according to the MPEG-1, 2 or 4 standard or the H.261, H.263 or H.264 standard, and may produce a small-screen picture sequence, for example, a sequence of pictures scaled down to 25% of their original size if necessary. The muxer 130 encapsulates output data from the texture coding unit 110, the small-screen picture sequence output from the base layer encoder 150, and motion vector data of the motion coding unit 120 into a predetermined format. The muxer 130 then multiplexes and outputs the encapsulated data into a set transmission format.

In the following description, the small-screen picture sequence is referred to as a base layer sequence, and the output frame/picture sequence of the MCTF encoder 100 is referred to as an enhanced layer sequence. The base layer sequence is a sequence of auxiliary frames that is provided to be selectively used in devices that may have lower performance capabilities than the capabilities of other devices that decode a sequence of main frames of the enhanced layer.

Figure 2:
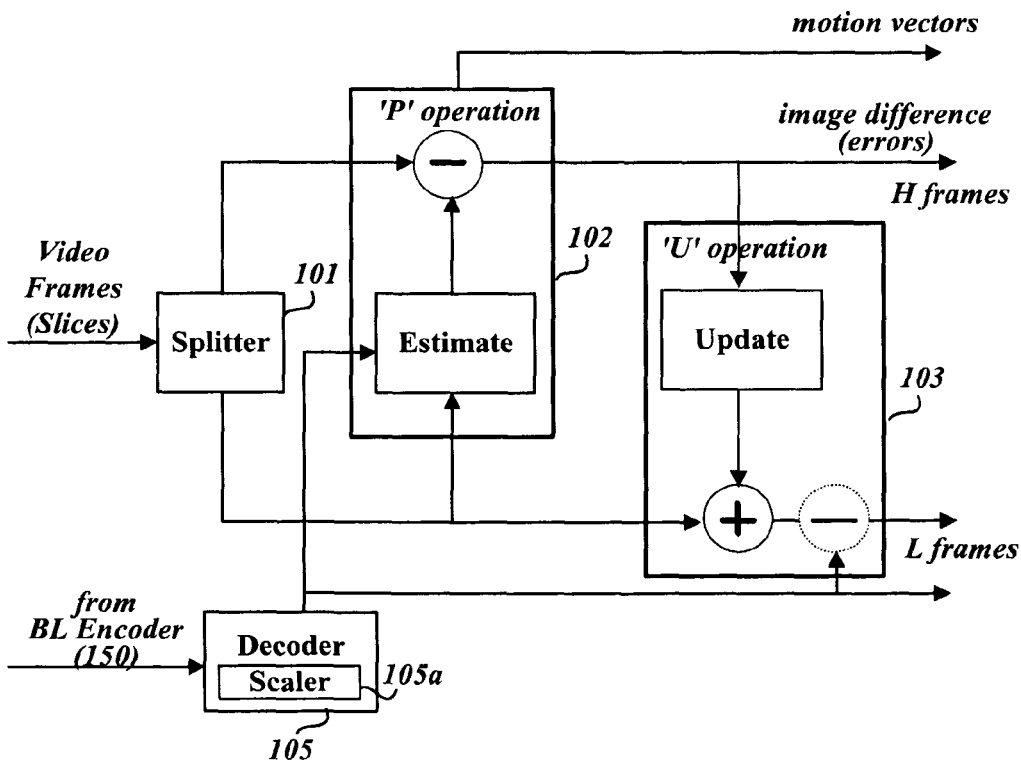
FIG. 2 is a block diagram of a filter that performs image estimation/prediction and update operations in the MCTF encoder as shown in FIG. 1.

The MCTF encoder 100 performs motion estimation and prediction operations on each target macroblock in a frame. The MCTF encoder 100 also performs an update operation in which an image difference of the target macroblock from a corresponding macroblock in a neighbor frame is added to the corresponding macroblock in the neighbor frame. FIG. 2 is a block diagram of a filter for carrying out these operations.

As shown in FIG. 2, the filter includes a splitter 101, an estimator/predictor 102, an updater 103, and a decoder 105. The splitter 101 splits an input video frame sequence into earlier and later frames in pairs of successive frames (for example, into odd and even frames). The decoder 105 decodes the sequence of encoded small-screen pictures received from the base layer encoder 150, and reconstructs pictures to have their original size using an internal scaler 105a. The estimator/predictor 102 performs motion estimation and prediction on each macroblock in the current frame that will be converted to a predicted frame. Specifically, the estimator/predictor 102 searches for a reference block of each macroblock in the current frame in neighbor frames of the enhanced layer prior to or subsequent to the current frame or in frames of the base layer, whose size have been restored by the scaler 105a. The estimator/predictor 102 then calculates an image difference (i.e., a pixel-to-pixel difference) of each macroblock in the current frame from the reference block in the neighbor frames of the enhanced layer and a motion vector from each macroblock to the reference block therein. Alternatively, the estimator/predictor 102 calculates an image difference of each macroblock in the current frame from a corresponding macroblock in a base layer frame in the same time as the current frame, whose size has been restored by the scaler 105a. The updater 103 performs an update operation on a macroblock, whose reference block has been found by the motion estimation, by normalizing the calculated image difference of the macroblock from the reference block and adding the normalized value to the reference block. Here, the scaler 105a may be provided as a separate unit outside the decoder 105. The operation carried out by the updater 103 is referred to as a 'U' operation, and a frame produced by the 'U' operation is referred to as an 'L' ("low") frame. The updater 103 selectively performs an operation for subtracting an enlarged base layer frame in the same time as the updated frame from the updated frame, and outputting a corresponding L frame produced by the subtraction.

The filter of FIG. 2 may perform its operations on a plurality of slices simultaneously and in parallel, which are produced by dividing a single frame, instead of performing its operations on the video frame. A frame (or slice) having an image difference, which is produced by the estimator/predictor 102, is referred to as an 'H' ("high") frame (or slice) since the difference value data in the 'H' frame (or slice) reflects high frequency components of the video signal. In the following description of the embodiments, the term 'frame' is used in a broad sense to include a 'slice'.

The estimator/predictor 102 divides each of the input video frames into macroblocks of a set size. For each divided macroblock, the estimator/predictor 102 searches for a block, whose image is most similar to that of each divided macroblock, in previous/next neighbor frames of the enhanced layer and/or in corresponding base layer frames enlarged by the scaler 105a. That is, the estimator/predictor 102 searches for a macroblock temporally correlated with each divided macroblock. A block having the most similar image to a target image block has the smallest image difference from the target image block. The image difference of two image blocks is defined, for example, as the sum or average of pixel-to-pixel differences of the two image blocks. Accordingly, of macroblocks in a previous/next neighbor frame and/or in a corresponding frame enlarged by the scaler 105a which have a predetermined threshold pixel-to-pixel difference sum (or average) or less from a target macroblock in the current frame, a macroblock having the smallest difference sum (or average) (i.e., the smallest image difference) from the target macroblock is referred to as a reference block. For each macroblock of a current frame, two reference blocks may be present in a frame (including a base layer frame) prior to the current frame and in a frame (including a base layer frame) subsequent thereto.

If the reference block is found, the estimator/predictor 102 calculates and outputs a motion vector from the current block to the reference block, and also calculates and outputs pixel error values (i.e., pixel difference values) of the current block from pixel values of the reference block, which is present in either the prior frame or the subsequent frame, or from average pixel values of the two reference blocks, which are present in the prior and subsequent frames.

If no macroblock providing a predetermined threshold image difference or less from the current macroblock is found in the two neighbor frames (including base layer frames) via the motion estimation operation, the estimator/predictor 102 determines whether or not a frame in the same time as the current frame (hereinafter also referred to as a "temporally coincident frame") or a frame in a close time to the current frame (hereinafter also referred to as a "temporally close frame") is present in the base layer sequence. If such a frame is present in the base layer sequence, the estimator/predictor 102 obtains the image difference of the current macroblock from a corresponding macroblock in the temporally coincident or temporally close frame based on pixel values of the two macroblocks, and does not obtain a motion vector of the current macroblock. A close time to the current frame corresponds to a time interval including frames that can be regarded as having the same image as the current frame. Information of this time interval is carried within an encoded stream, which will be described later.

The corresponding macroblock in the same or close time in the base layer may be used even when a reference block is found for the current macroblock. Specifically, the pixel value differences of the current macroblock can be calculated, based on, for example the average pixel values of the found reference macroblock and the corresponding base layer macroblock. In this case, a motion vector is determined for the current macroblock whose reference block is found, and information indicating that a base layer frame has been used is recorded in a header of the current macroblock.

Such an operation of the estimator/predictor 102 is referred to as a 'P' operation.

The MCTF encoder 100 generates a sequence of H frames and a sequence of L frames, respectively, by performing the 'P' and 'U' operations described above on a certain-length sequence of pictures, for example, on a group of pictures (GOP). Then, an estimator/predictor and an updater at a next temporal decomposition stage (not shown) generates a sequence of H frames and a sequence of L frames by repeating the 'P' and 'U' operations on the generated L frame sequence. The 'P' and 'U' operations are performed an appropriate number of times to produce a final enhanced layer sequence.

Figure 3:
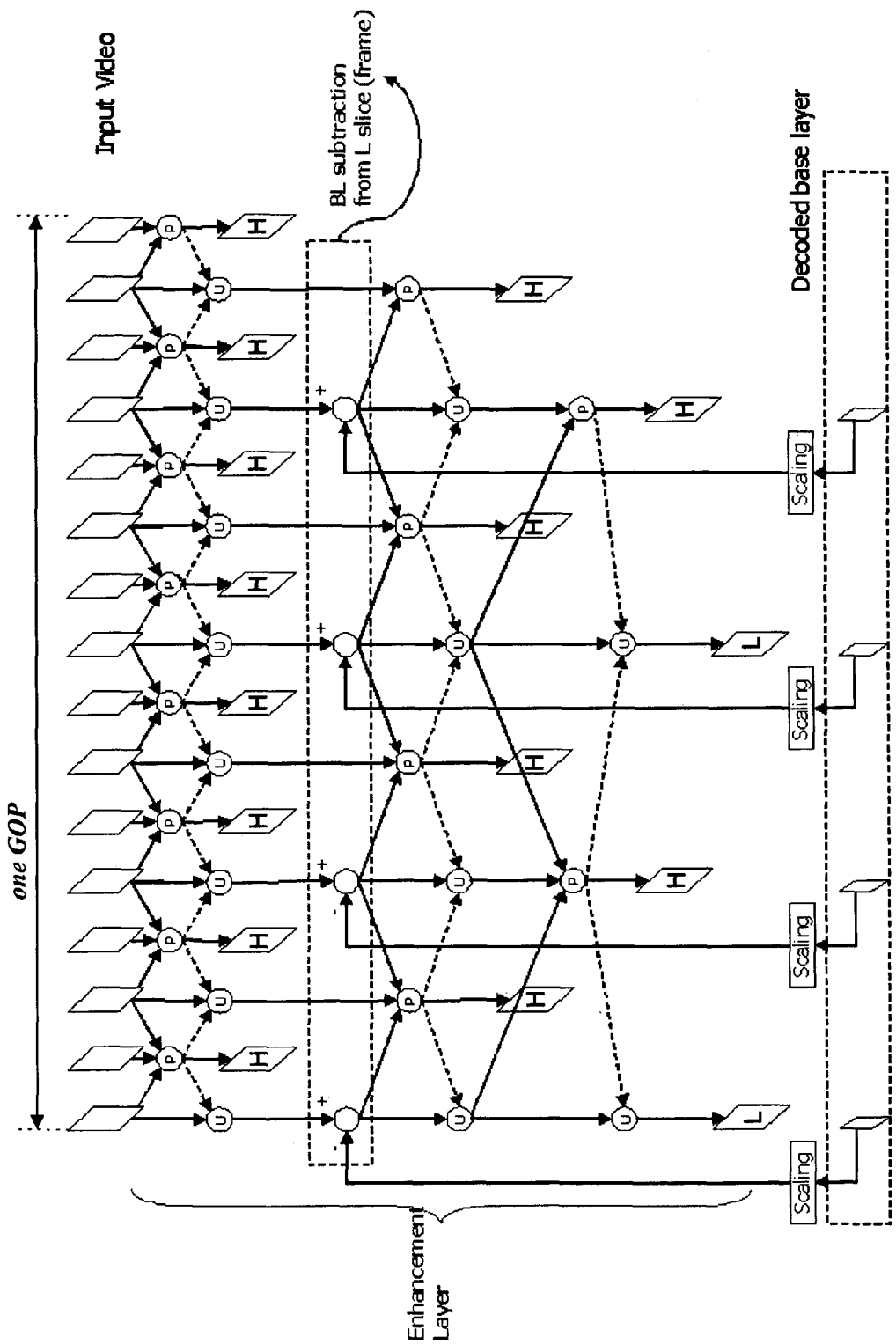
FIG. 3 illustrates how L frames and H frames having image differences are produced from a picture sequence in a group of pictures (GOP) according to an embodiment of the present invention.

FIG. 3 shows an example of such a procedure in which the 'P' and 'U' operations are performed three times (i.e., up to a 3rd encoding level) on one GOP until two L frames remain. In the example of FIG. 3, the updater 103 in the MCTF encoder 100 generates a 2nd-level sequence of L frames from a 1st-level sequence of L frames by subtracting a sequence of temporally-coincident enlarged frames received from the scaler 105a from the 1st-level sequence of L frames. It is also possible to generate a next-level sequence of L frames by subtracting the temporally-coincident enlarged frames from L frames of a level other than the 1st level. For example, in the case where enlarged base-layer pictures provided from the scaler 105a are not synchronized with 1st-level L frames, the level of a sequence of L frames from which the base layer pictures will be subtracted is increased to reduce the time difference of the video signals of the two layers, and the enlarged base-layer pictures are subtracted from the L frames of the increased level.

If an enhanced layer sequence is produced by subtracting a sequence of small-screen frames provided in the base layer from a sequence of L frames of an appropriate level as described above, image redundancy is removed from the enhanced layer sequence, thereby reducing the amount of coded data and increasing coding gain.

Figures 4, 5A:
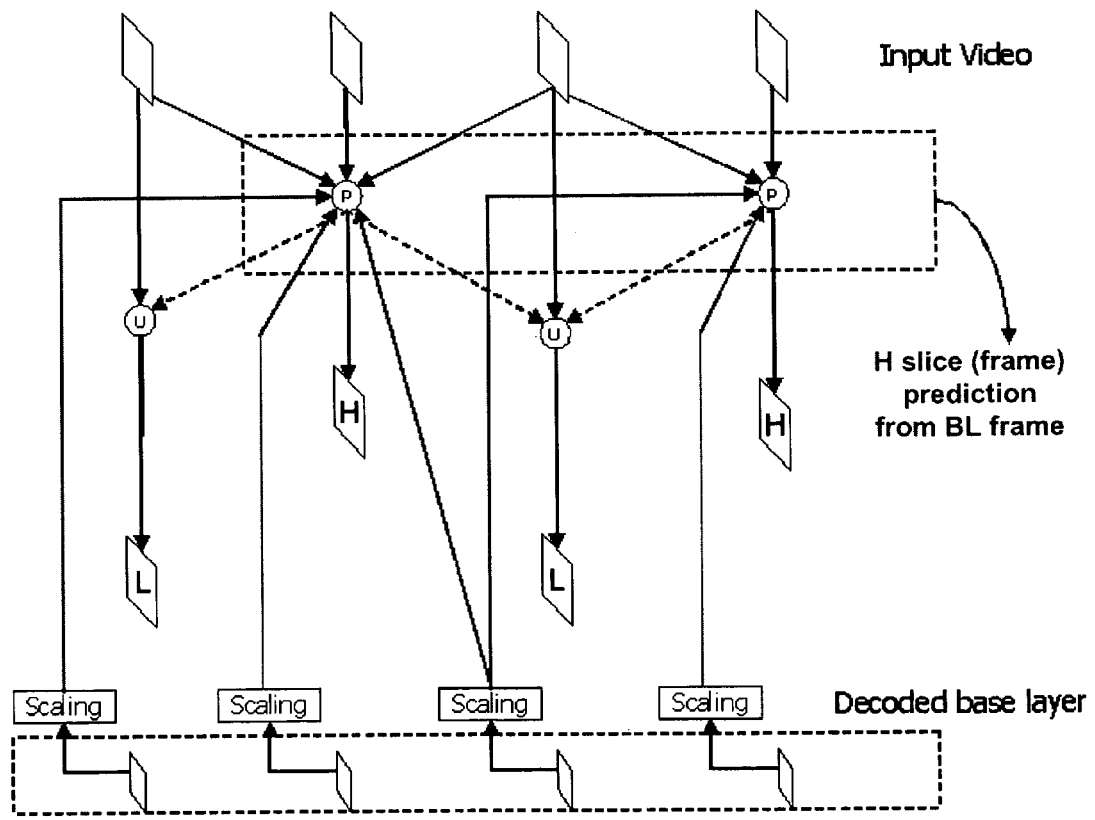
FIG. 4 illustrates the structure of timing information according to an embodiment of the present invention, which indicates a temporal correlation between main frames of an enhanced layer and auxiliary frames of a base layer and which is inserted and transmitted in a bitstream of the enhanced layer.
FIGS. 5a and 5b illustrate the relationship between frames of the enhanced and the base layers which can be used as references to produce an H frame having a predicted image according to an embodiment of the present invention.

While performing scalable encoding in the above manner, the MCTF encoder 100 incorporates liming information, which has a structure as shown in FIG. 4. The timing information is used for synchronizing the enhanced layer to the base layer into a bitstream of the enhanced layer. The MCTF encoder 100 receives information required to provide liming information, as shown in FIG. 4, from the base layer encoder 150 and/or obtains the required information from externally input and set values. The timing information of FIG. 4 is inserted and transmitted in a bitstream of the enhanced layer periodically or once at the initial transmission of the bitstream.

In the timing information structure of FIG. 4, a field 'flag_BL_fixed_frame_rate' contains information indicating whether or not the base layer bitstream is encoded at a fixed frame rate in the base layer encoder 150. A field 'BL_time_increment_resolution' contains information representing the 'resolution' of a time value recorded in a field 'BL_time_increment'. For example, if '1' (second) is recorded in the field 'BL_time_increment' and '5' is recorded in the field 'BL_time_increment_resolution', this indicates that base layer frames are transmitted at 5 frames per second. A field THR_temporal_coincident indicates the time interval between an enhanced layer frame and a base layer frame that are regarded as having the same time. For example, this field may have a value in milliseconds. Specifically, when this value is 10, the decoder regards both an enhanced layer frame and a base layer frame as having the same image (i.e., as being coincident) if the difference between a time value of the enhanced layer frame, which is inserted in the frame during encoding, and a time value of the base layer frame calculated from the frame rate (where the frame rate=the number of received base layer frames*$BL_{time}$_increment/'BL_time_increment_resolution') is less than 0.01 second.

When the estimator/predictor 102 performs the 'P' operation to produce an H frame, i.e., when it searches for a reference block of each macroblock in the current frame and converts each macroblock to a predicted image block, the estimator/predictor 102 can selectively use enlarged pictures of the base layer received from the scaler 105a, in addition to neighbor L frames of the enhanced layer prior to and subsequent to the current frame, as shown in FIG. 5a.

Figure 5B:
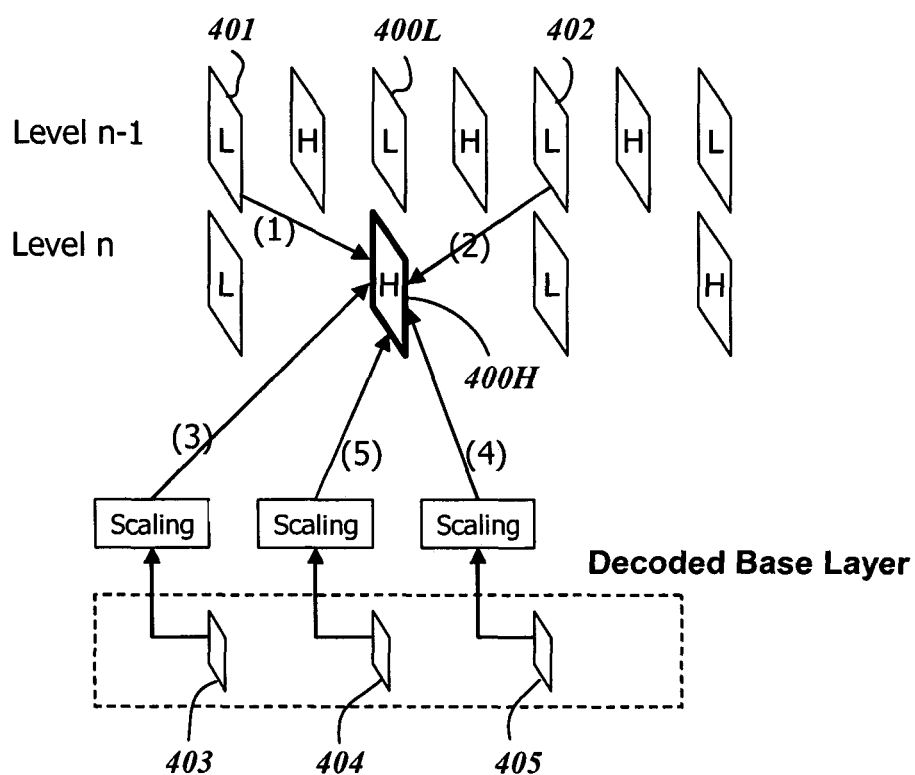

In an example embodiment of the present invention, five frames are used to produce each H frame. FIG. 5b shows five frames that can be used to produce an H frame. Specifically, L frames 401 and 402 are in the same MCTF level as a current L frame 400L and respectively positioned prior to and subsequent to the L frame 400L. A frame 405 of the base layer is in the same time as the L frame 400L. Frames 403 and 405 respectively positioned, prior to and subsequent to the frame 404, are used to produce an H frame 400H from the current L frame 400L.

Figure 6:
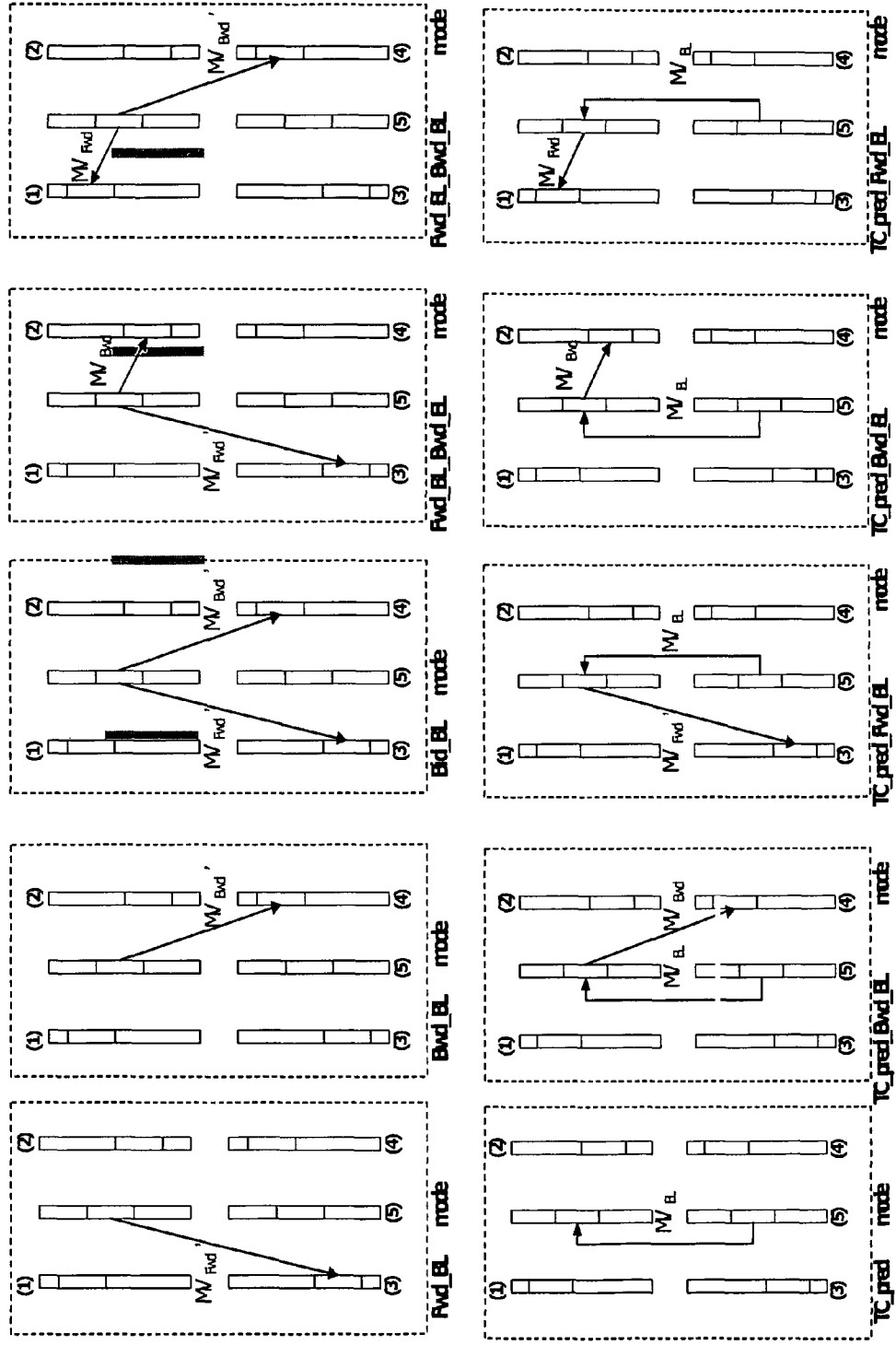
FIG. 6 illustrates limited examples of various reference block selection modes of a macroblock produced by the filter of FIG. 2.

FIG. 6 shows some examples of reference block selection modes according to an example embodiment of the present invention in which one or two are selected from five frames to convert a macroblock to image difference data. In FIG. 6, 'Fwd_BL_mode' denotes a reference block selection mode which uses a reference block present in a past picture in the base layer sequence. 'Bwd_BL_mode' denotes a reference block selection mode which uses a reference block present in a future picture in the base layer sequence. 'Bid_BL mode' denotes a reference block selection mode which uses two reference blocks present in a past picture and in a future picture in the base layer sequence. 'Fwd_BL_Bwd_EL_mode' denotes a reference block selection mode which uses two reference blocks present in a past picture in the base layer and in a future picture in the enhanced layer. 'Fwd_EL_Bwd_BL_mode' denotes a reference block selection mode which uses two reference blocks present in a past picture in the enhanced layer and in a future picture in the base layer. In addition, 'TC_pred_mode' denotes a reference block selection mode which uses pixel values of a corresponding block in a picture in the base layer in the same time as the current frame. 'TC_pred_Bwd_BL_mode' denotes a reference block selection mode which uses a corresponding block in a picture in the base layer in the same time as the current frame and a reference block present in a future picture in the base layer. 'TC_pred_Fwd_BL_mode' denotes a reference block selection mode which uses a corresponding block in a picture in the base layer in the same time as the current frame and a reference block present in a past picture in the base layer. 'TC_pred_Bwd_EL_mode' denotes a reference block selection mode which uses a corresponding block in a picture in the base layer in the same time as the current frame and a reference block present in a future picture in the enhanced layer. 'TC_pred_Fwd_EL_mode' denotes a reference block selection mode which uses a corresponding block in a picture in the base layer in the same time as the current frame and a reference block present in a past picture in the enhanced layer.

There are various other modes not shown in FIG. 6. To inform the decoder of which one of the modes shown in FIG. 6 and the various other modes not shown therein is employed, the MCTF encoder 100 transmits 'reference block selection mode' information having a structure as shown in FIG. 7 to the texture coding unit 110 after inserting/writing it into a "Ref_Sel_mode" field at a specified position of a header area of a corresponding macroblock as shown in FIG. 8. The "Ref_Sel_mode" field can be inserted in the header of a frame (or slice) so that the same two reference pictures can be used in the same frame (or slice).

In the reference block selection mode information structure of FIG. 7, 'flag_use_BL' denotes information indicating whether or not the base layer is used for the reference block, and 'reference_selection_code' denotes a field in which a value about one of the above-mentioned modes is written. The value in the field 'reference_selection_code' indicates which one or two of the five frames described above are used to produce the image difference of the current macroblock.

Figures 9, 10:
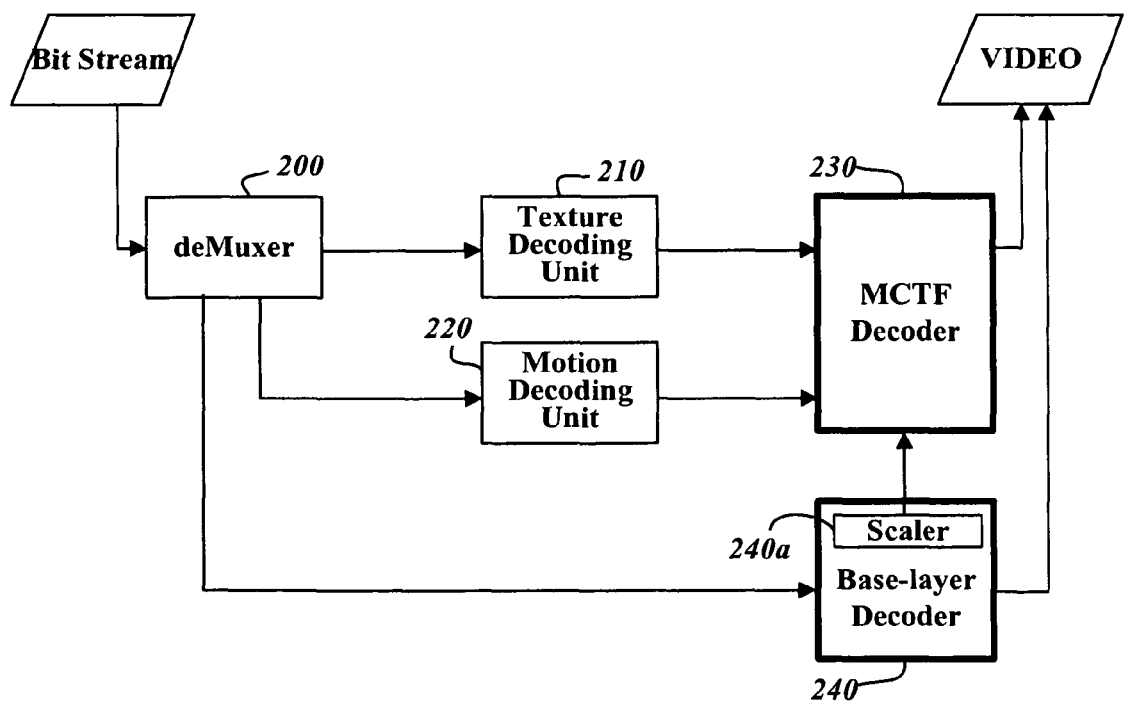
FIG. 9 illustrates the structure of information of the encoding level of L frames of the enhanced layer from which images of auxiliary frames of the base layer have been subtracted.
FIG. 10 is a block diagram of a device for decoding a bitstream encoded by the device of FIG. 1.

The MCTF encoder 100 also transmits information of the level (i.e., MCTF level) of an L frame sequence, from which the base layer picture sequence has been subtracted, after writing the level information having a structure, as shown in FIG. 9, into a BL_subtraction field at a specified position of a header area of the corresponding GOP as shown in FIG. 8.

In the information structure shown in FIG. 9, 'flag_use_BL' denotes information indicating whether or not the base layer is used for the corresponding GOP, and 'BL_subtraction_level' denotes information indicating the level of an L frame sequence from which the base layer picture sequence has been subtracted.

The data stream encoded in the method described above is transmitted by wire or as a wireless transmission to a decoding device. Alternatively, it may be delivered via recording media. The decoding device restores the original video signal in the enhanced and/or base layer according to the method described below.

FIG. 10 is a block diagram of a device for decoding a data stream encoded by the device of FIG. 1. The decoding device of FIG. 10 includes a demuxer (or demultiplexer) 200, a texture decoding unit 210, a motion decoding unit 220, an MCTF decoder 230, and a base layer decoder 240. The demuxer 200 separates a received data stream into a compressed motion vector stream, a compressed macroblock information stream, and a base layer stream. The texture decoding unit 210 decodes the compressed bitstream. The motion decoding unit 220 decodes the compressed motion vector information. The MCTF decoder 230 decodes the bitstream containing macroblock information and the motion vector in an MCTF scheme. The base layer decoder 240 decodes the base layer stream according to a specified scheme, for example, according to the MPEG-4 or H.264 standard. The base layer decoder 240 includes therein a scaler 240a that enlarges a small-screen picture sequence in the base layer to the enhanced layer picture size. The scaler 240a may be provided as a separate unit outside the base layer decoder 240.

Figure 11:
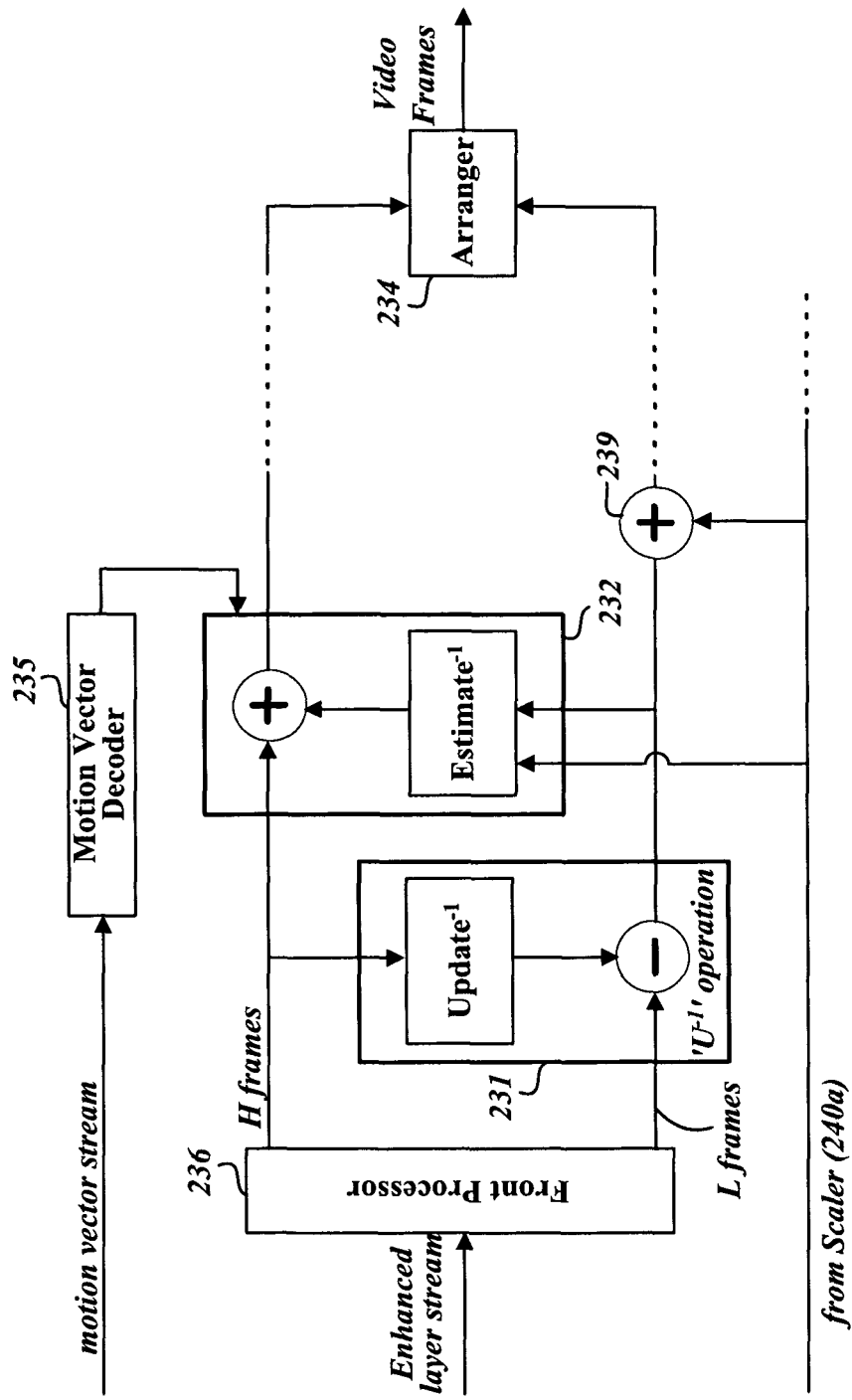
FIG. 11 is a block diagram of an inverse filter that performs inverse prediction and update operations in an MCTF decoder shown in FIG. 10.

The MCTF decoder 230 includes, as an internal element, an inverse filter that has a structure as shown in FIG. 11 for decoding an input bitstream into a frame sequence.

The inverse filter of FIG. 11 includes a front processor 236, an inverse updater 231, an inverse predictor 232, a motion vector decoder 235, and an arranger 234. The front processor 236 divides an input enhanced layer stream into H frames and L frames, and analyzes information in each header in the enhanced layer stream. The inverse updater 231 subtracts pixel difference values of input H frames from corresponding pixel values of input L frames. The inverse predictor 232 restores input H frames to frames having original images with reference to the L frames, from which the image differences of the H frames have been subtracted, and/or with reference to enlarged pictures output from the scaler 240a. The motion vector decoder 235 decodes an input motion vector stream into motion vector information of each block and provides the motion vector information to the inverse predictor 232. The arranger 234 interleaves the frames completed by the inverse predictor 232 between the L frames output from the inverse updater 231, thereby producing a normal video frame sequence.

Although one inverse updater 231 and one inverse predictor 232 are illustrated above, the inverse updaters 231 and the inverse predictors 232 are provided in multiple stages corresponding to the MCTF encoding levels described above. As denoted by "239" in FIG. 11, image values of enlarged pictures from the scaler 240a are added to corresponding image values of L frames output from an inverse updater 231 of one of the multiple stages. Based on the value of the information "BL_subtraction_level" shown in FIG. 9 carried within the enhanced layer stream, the MCTF decoder 230 determines the stage (encoding level) of L frames to which the base layer frames are to be added.

The front processor 236 analyzes and divides an input enhanced layer stream into an L frame sequence and an H frame sequence. In addition, the front processor 236 uses information in each header in the enhanced layer stream to notify the inverse predictor 232 of which frame or frames have been used to produce macroblocks in the H frame. The used frame or frames can be determined from received 'reference_selection_code' information as shown in FIG. 7.

For each macroblock of an H frame, the inverse predictor 232 may specify an L frame in the enhanced layer and/or an enlarged frame in the base layer used to produce a predicted image of the macroblock of the H frame, and determine a reference block in the specified frame(s) based on a motion vector provided from the motion vector decoder 235, and then add pixel values of the reference block or average pixel values of the two reference blocks to pixel difference values of the macroblock of the H frame, thereby restoring the original image of the macroblock thereof. In the case of using a base layer frame, the inverse predictor 232 refers to timing information shown in FIG. 4 analyzed by the front processor 236 to specify an auxiliary frame in the base layer prior to, subsequent to, or temporally coincident with the current H frame. If output frames of the base layer decoder 240 are counted, it is possible to determine the time of each base layer frame from the information shown in FIG. 4, so that it is possible to determine whether the base layer frame is prior to or subsequent to the current H frame. Whether or not each base layer frame is in the same time as the current H frame is determined based on both the time difference between the two frames and the value 'THR_temporal_coincident'.

For one H frame, the MCTF decoding is performed in specified units, for example, in units of slices in a parallel fashion, so that all macroblocks in the frame approximately restore their original images, and the original images are combined to constitute a complete video frame.

The above decoding method restores an MCTF-encoded data stream to a complete video frame sequence. In the case where the estimation/prediction and update operations have been performed for a GOP N times in the MCTF encoding procedure described above, a video frame sequence with the original image quality is obtained if the inverse prediction and update operations are performed N times, whereas a video frame sequence with a lower image quality and at a lower bitrate is obtained if the inverse prediction and update operations are performed less than N times. However, it is possible to achieve a higher image quality by decoding and outputting a frame sequence in the base layer, instead of obtaining a low bitrate video frame sequence according to the MCTF scheme. Accordingly, the decoding device is designed to perform inverse prediction and update operations to the extent suitable for its performance or is designed to decode only the base layer streams.

The decoding device described above can be incorporated into a mobile communication terminal or the like or into a recording media playback device.

As is apparent from the above description, a method and device for encoding/decoding video signals according to the present invention has advantages in that a base layer provided for low-performance decoders, in addition to an enhanced layer, is used in an MCTF encoding procedure to produce H and L frames, thereby reducing the total amount of coded data and thus improving the MCTF coding efficiency.

Although this invention has been described with reference to the preferred embodiments, it will be apparent to those skilled in the art that various improvements, modifications, replacements, and additions can be made in the invention without departing from the scope and spirit of the invention. Thus, it is intended that the invention cover the improvements, modifications, replacements, and additions of the invention, provided they come within the scope of the appended claims and their equivalents.

What is claimed is:

1. A method of decoding a video signal, comprising:
    separating a base layer stream and an enhanced layer stream from the video signal;
    obtaining prediction information indicating whether inter-layer prediction is used for a current block in an enhanced layer, the inter-layer prediction is to predict the current block by using a base layer;
    obtaining macroblock information and motion information of the current block from the enhanced layer stream;
    obtaining reference information of the current block based on the prediction information, the reference information indicating a position of a reference block in the base layer; and
    decoding the current block by using the reference information, the macroblock information and the motion information of the enhanced layer.

2. The method of claim 1, wherein the reference block is a block of the base layer having the smallest image difference from the current block.

3. The method of claim 1, wherein the reference information comprises a motion vector between the current block and the reference block.

* * * * *